(12) United States Patent
Magielse et al.

(10) Patent No.: US 10,595,379 B2
(45) Date of Patent: Mar. 17, 2020

(54) ILLUMINATION CONTROL

(71) Applicant: SIGNIFY HOLDING B.V., Eindhoven (NL)

(72) Inventors: Remco Magielse, Tilburg (NL); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/333,769

(22) PCT Filed: Sep. 11, 2017

(86) PCT No.: PCT/EP2017/072736
§ 371 (c)(1),
(2) Date: Mar. 15, 2019

(87) PCT Pub. No.: WO2018/050590
PCT Pub. Date: Mar. 22, 2018

(65) Prior Publication Data
US 2019/0215931 A1    Jul. 11, 2019

(30) Foreign Application Priority Data

Sep. 16, 2016 (EP) .................................. 16189241

(51) Int. Cl.
*H05B 37/02* (2006.01)
*H05B 39/04* (2006.01)
*H05B 41/36* (2006.01)

(52) U.S. Cl.
CPC ..... *H05B 37/0227* (2013.01); *H05B 37/0272* (2013.01)

(58) Field of Classification Search
None
See application file for complete search history.

(56) References Cited

U.S. PATENT DOCUMENTS

| 7,619,366 B2 * | 11/2009 | Diederiks | H05B 37/0227 250/214 AL |
| 9,501,718 B1 * | 11/2016 | Sarnaik | G06K 9/6202 |
| 2004/0160199 A1 | 8/2004 | Morgan et al. | |
| 2013/0043797 A1 * | 2/2013 | Huang | H05B 37/0272 315/158 |
| 2013/0249410 A1 * | 9/2013 | Thompson | H05B 37/0227 315/158 |

FOREIGN PATENT DOCUMENTS

| WO | 2007072285 A1 | 6/2007 |
| WO | 2009004539 A1 | 1/2009 |
| WO | 2013054221 A1 | 4/2013 |
| WO | 2016037772 A1 | 3/2016 |

* cited by examiner

*Primary Examiner* — Anh Q Tran
(74) *Attorney, Agent, or Firm* — Meenakshy Chakravorty

(57) ABSTRACT

A lighting control system and method for controlling a plurality of lighting units wherein an image of a space including the lighting units is obtained, and certain non-lighting objects in the space are identified. The objects can be associated with light settings, and the relative position of lighting units to the objects allows the lighting units to be selectively associated with those light settings also. Linking of lighting units, non-lighting objects, and control settings in this way arranged can be achieved with minimal user input, and provides improved control of lighting in an environment.

14 Claims, 5 Drawing Sheets

| Luminaire | 1 | 2 | 3 | 4 |
|---|---|---|---|---|
| Brightness | 24 | 24 | - | 16 |
| Colour | 122 | 248 | - | 122 |

Figure 5a

| | |
|---|---|
| No of luminaires | 3 |
| Brightness | 24 |
| Colour | 122 |

Figure 5b

| | |
|---|---|
| Distance | 2m |
| Brightness | 24 |
| Colour | 122 |

Figure 5c

ILLUMINATION CONTROL

CROSS-REFERENCE TO PRIOR APPLICATIONS

This application is the U.S. National Phase application under 35 U.S.C. § 371 of International Application No. PCT/EP2017/072736, filed on Sep. 11, 2017, which claims the benefit of European Patent Application No. 16189241.9, filed on Sep. 16, 2016. These applications are hereby incorporated by reference herein.

TECHNICAL FIELD

The present disclosure relates to control of illumination in an illumination system.

BACKGROUND

"Connected lighting" refers to a system of luminaires which are controlled not by (or not only by) a traditional wired, electrical on-off or dimmer circuit, but rather via a wired or more often wireless network using a digital communication protocol. Typically, each of a plurality of luminaires, or even individual lamps within a luminaire, may each be equipped with a wireless receiver or transceiver for receiving lighting control commands from a lighting control device according to a wireless networking protocol such as ZigBee, Wi-Fi or Bluetooth (and optionally also for sending status reports to the lighting control device using the wireless networking protocol).

Luminaires may have individually controllable parameters, such as brightness and color, and one or more luminaires may be controlled together in a group in a coordinated manner to create an overall light distribution, or scene, for illuminating an area or space such as room in a desired manner. Combinations of different luminaires and/or different settings of the luminaires can achieve a different overall illumination of the area of space, as desired.

Rather than having to control individual luminaires, or even individual settings for the or each luminaire, in order to achieve a desired illumination, it is usually preferable for groups of settings to be stored together corresponding to a desired light distribution, or scene. For example a "morning" scene, or a "relaxing" scene can be created, which can then be recalled quickly and easily by a user with a single command. Such scenes can be created for particular activities, such as dining or reading for example, providing suitable illumination levels and conditions.

SUMMARY

Storing information such as multiple settings relating to an activity or activities can improve a lighting system and result illumination which is better suited to a user's needs, however a user may find it time consuming or inconvenient to provide such information.

It would be desirable to provide improved illumination control, and in particular, to provide improved set up of a lighting system.

Accordingly, in one aspect of the invention there is provided a lighting control method for controlling a plurality of lighting units arranged to provide illumination in an area, the method comprising: receiving one or more images of the area; determining the position of at least one of said lighting units or the corresponding lighting footprint in said area; identifying one or more non-lighting objects in a received image, said non-lighting object associated with at least one light setting; determining the relative position of said at least one non-lighting object and said at least one lighting unit or the corresponding lighting footprint; associating, based on the relative position, said at least one lighting units with said at least one light setting; and controlling said at least one lighting unit based on said at least one setting.

In this way, contextual lighting information (linking of lighting units, non-lighting objects, and control settings) can be input to a lighting system quickly and easily, without requiring considerable effort from a user. The taking of an image or series of images may be all that is required in embodiments. Lighting units, or luminaires, and other objects can automatically be recognized, and by determining the proximity of lighting units to those objects, illumination output can be controlled more intelligently, better to match a user's needs.

Linking of lighting units, non-lighting objects, and control settings in this way arranged can be achieved with minimal user input In embodiments, the method further comprises capturing said received one or more images with an image capture device, by a user. In such a case, a user need only take one, or a series of images to add the contextual information to the system. The user can be prompted to take such an image or images, and in embodiments, a prompt or prompts may be provided to the user to assist in timing and/or direction or position of image capture. In embodiments multiple sub-images can be combined to create a panoramic image, which allows a greater field of view to be obtained than from a single image alone, and in some cases a full 360 degree panorama can be obtained.

The position of a lighting unit or the corresponding lighting footprint may be determined based on identification in a received image in embodiments. That is, the lighting unit can be identified based on its appearance in the image. This might be a sufficient determination of position, or alternatively a transformation or mapping can be used to determine a position in 3D space, based on the image. The identification in the image may be of the lighting unit itself, or more likely the light emitted, incident on surrounding surfaces, sometimes referred to as the illumination footprint. In some cases the illumination footprint can be used to determine the location of the corresponding lighting unit, or at least to identify the corresponding lighting unit.

In order to assist with identification, lighting units can be controlled during capture of a received image in embodiments, for example by outputting light or light patterns which have distinctly recognizable characteristics, and which do not typically provide useful or desirable illumination. Such output may include colored and/or coded light, or a dynamic lighting sequence for example. In the case of a dynamic sequence, the timing can be synchronized or coordinated with the image capture, for example by communication exchanges between the lighting unit and the image capture device. In addition to, or as an alternative to outputting light or light patterns, lighting units can be controlled to output other signals such as beacon signals which can be received by the image capture device, possibly while the image or images are being captured. This may be achieved using RF signals, such as extensions of Bluetooth, and directional antennas for example.

In embodiments identifying said one or more non-lighting objects comprises matching with one or more predetermined non-lighting objects, each associated with one or more predetermined light settings. For example a plurality of predetermined objects or objects types may be stored, and received images can be correlated with stored images or image attributes, to determine a possible match, using known image/object recognition algorithms. Classes of object types may be defined, for example a screen type, which can include a computer monitor and a television, which can be associated with a lighting setting or control parameters for instance. Examples of non-lighting objects which can be identified in various embodiments include: a television, a monitor, a games console, a speaker, a chair, a table, a desk, or a window. Objects do not include persons and in an embodiment, objects are static only (i.e. non moving).

The non-lighting object or objects can be associated with a pre-defined user activity in embodiments, and the user activity can be associated with a light setting. Thus an indirect link can be established between a non-lighting object and a light setting. This also allows greater flexibility for multiple objects to be associated with a common setting, and conversely for multiple settings to be associated with a single object. For example both a lounge chair and a television can be associated with a television watching activity, which can in turn have a corresponding light setting, however the lounge chair may also be associated with a music listening activity, having a different setting.

In one embodiment, lighting units determined to be within a predetermined distance of said non-lighting object are associated with that non-lighting object, and are controlled according to the at least one setting associated with said non-lighting object. In a further embodiment, the at least one setting associated with said identified non-lighting object defines a number, N, of lighting units to be controlled, and wherein the N lighting units determined to be closest to the non-lighting object are controlled according to said setting.

Associating lighting units with a light setting comprises a negative association in some embodiments, whereby controlling the relevant lighting unit comprises preventing or reducing the extent to which the lighting unit is controlled according to the light setting. In another embodiment, a setting associated with said non-lighting object allows lighting units to be controlled by the non-lighting object, and wherein lighting units are controlled based on output from said non-lighting object, in dependence upon their relative position with respect to that object. Typically lighting units within a predefined distance from the object can be controlled in this way.

Aspects of the invention also provide a lighting controller and a lighting system for implementing lighting control methods as described above. The lighting controller arranged for controlling a plurality of lighting units each arranged to provide illumination in an area, the lighting controller comprising an interface for receiving (or a sensor for capturing) one or more images of the area; and a processor arranged for: determining the position of at least one of said lighting units or a corresponding lighting footprint in said area; identifying one or more non-lighting objects in a received image of the one or more images of the area, said non-lighting object associated with at least one light setting; determining a relative position of said at least one non-lighting object and said at least one lighting unit or the corresponding lighting footprint; associating, based on the relative position, said at least one lighting unit with said at least one light setting; and controlling, for example via a further interface, said at least one lighting unit based on said at least one light setting. The lighting controller can be implemented as a smart phone or other computer device. It can be a device running the computer program product according to the claims. The lighting system comprises the lighting controller and one or more of the plurality of lighting units, and/or the sensor (e.g. camera) for capturing the one or more images of the area.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention extends to methods, apparatus and/or use substantially as herein described with reference to the accompanying drawings.

Any feature in one aspect of the invention may be applied to other aspects of the invention, in any appropriate combination. In particular, features of method aspects may be applied to apparatus aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which:

FIGS. 5a-5c shows data representing different types of illumination settings;

DETAILED DESCRIPTION OF EMBODIMENTS

Figure 1:
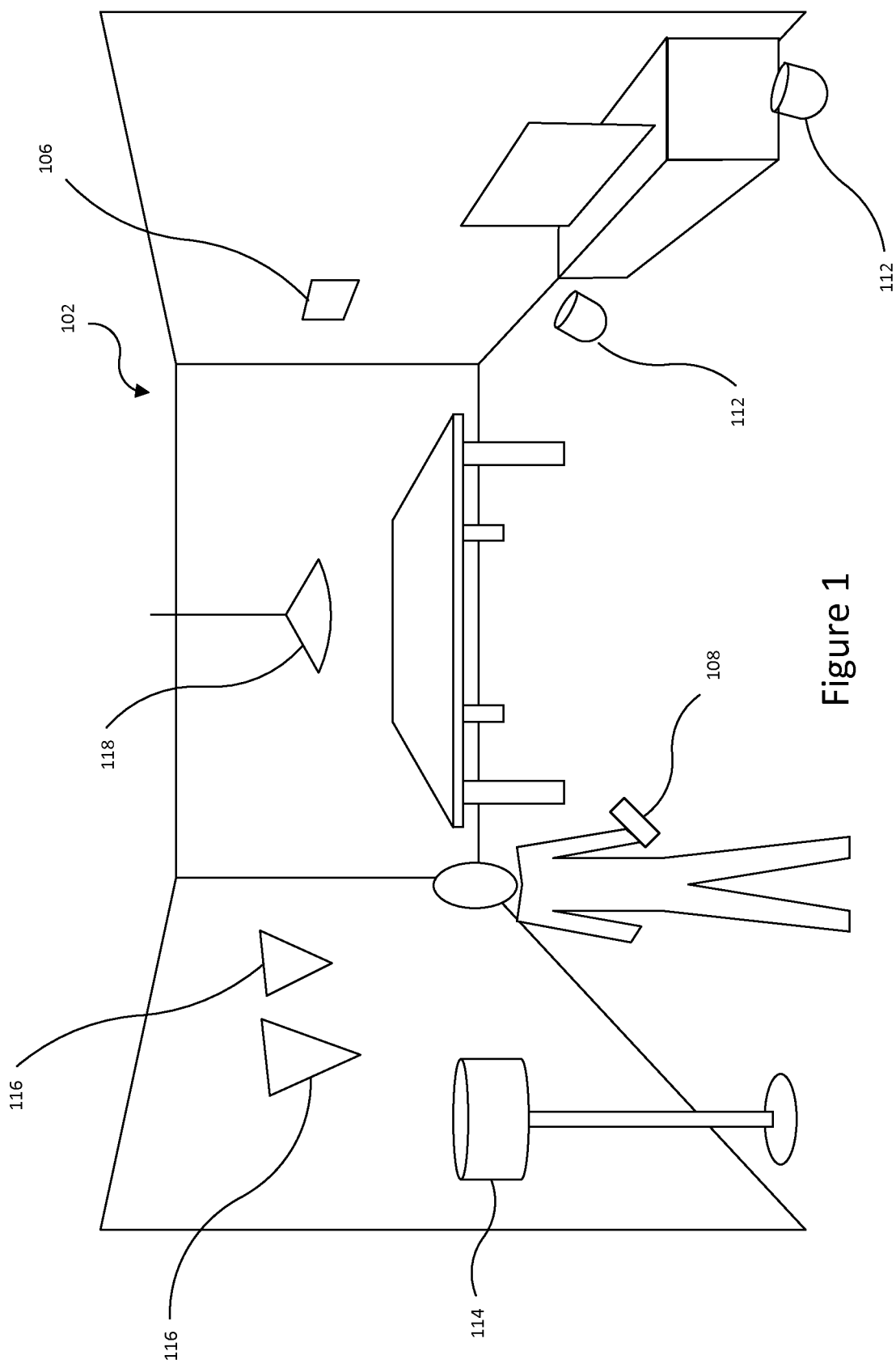
FIG. 1 shows an example of a room including a plurality of lighting units.

FIG. 1 shows a lighting system installed or otherwise disposed in an environment 102, e.g. an indoor space such as a room, or any other space or environment that can be occupied by one or more people such as the interior of a vehicle. The lighting system comprises one or typically a plurality of luminaires, each comprising one or more lamps (illumination emitting elements) and any associated housing, socket(s) and/or support. LEDs may be used as illumination emitting elements, but other alternatives such as incandescent lamps e.g. halogen lamps are possible. A luminaire is a lighting device for emitting illumination on a scale suitable for illuminating an environment 102 occupiable by a user. In this example, luminaries include a floor standing lamp 114, wall mounted uplighters 116, a ceiling pendant 18, and two floor mounted wall washers 112. Other examples include a spotlight or uplighter or downlighter. A system may include multiple instances of a luminaire type, and multiple different luminaire types. Luminaires can be portable (i.e. their location can be changed easily, and can even continue to run for a limited period of time without connection to mains due to internal energy storage units)

A user can control the lighting system via a user terminal such as a wall panel 106. Alternatively or additionally a mobile user terminal 108 may be provided in order to allow the user to control the lighting system. This may be in the form of a smartphone or tablet for example, running an application or "app", or may be a dedicated remote control. The user terminal or terminals comprise a user interface such as a touchscreen or a point-and-click interface arranged to enable a user (e.g. a user present in the environment 102, or located remotely in the case of a mobile terminal) to provide user inputs to the lighting control application.

Figure 2:
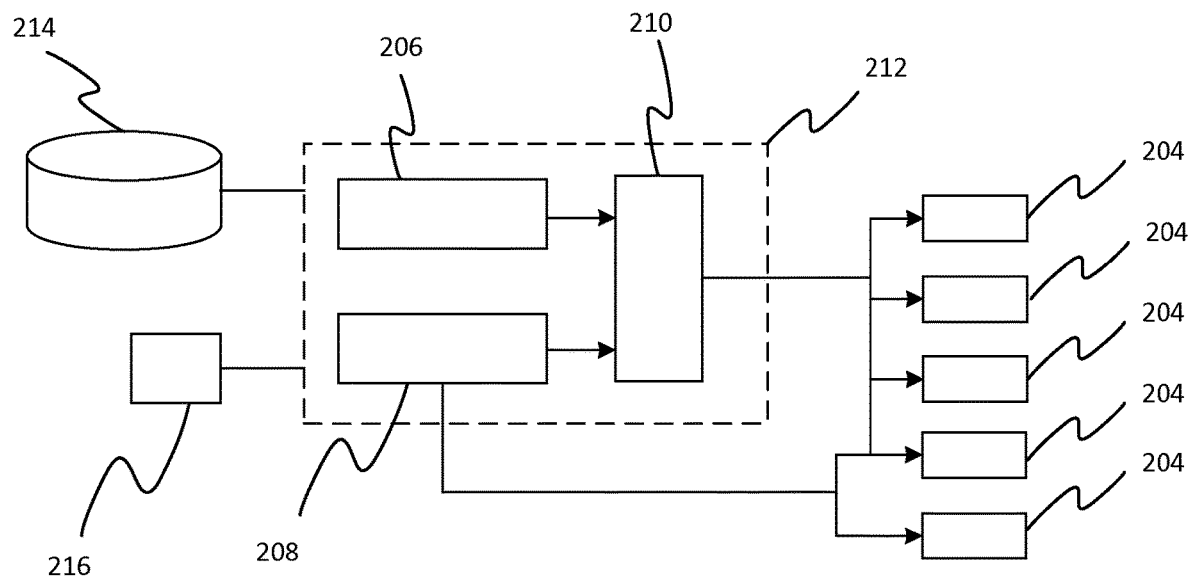
FIG. 2 illustrates a lighting system schematically.

Referring to FIG. 2, an example of a lighting system is shown schematically. A user terminal 206, connects to luminaires 204 via an intermediate device 210 such as a wireless router, access point or lighting bridge. User terminal 206 could for example be the wall panel 106 of FIG. 1, and the intermediate device could be integrated in the wall panel or provided as a separate device. User terminal 208 is a mobile user terminal, such as terminal 108 of FIG. 1, and may also connect to the luminaires via the device 210, but may additionally or alternatively connect to the luminaires directly without an intermediate device. User terminal 208 may also be spatially fixed, but share the properties of a mobile user terminal in that it can connect directly to a luminaire, such as in the case of a stand-alone wall switch. Connection between the devices may be wired, using a protocol such as DMX or Ethernet, or wireless using a networking protocol such as ZigBee, Wi-Fi or Bluetooth for example. Luminaires may be accessible only via device 210, only directly from a user terminal, or both.

For instance the user terminal 206 may connect to the intermediate device 210 via a first wireless access technology such as Wi-Fi, while the device 201 may connect onwards to the luminaires 4 via a second wireless access technology such as ZigBee. In this case intermediate device 210 converts the lighting control commands from one protocol to another.

Device 210 and user terminals 206 and 208 comprise a functional group illustrated schematically by dashed line and labelled 212. This functional group may further be connected to a storage device or server 214, which may be part of a network or the internet for example. Each element of the group 212 may include a memory, or have access to a storage function, which may be provided by storage device or server 214. Luminaires 204, or at least some of the luminaires 204, also include a memory.

This arrangement allows input of user commands at the user interface of a user terminal 206 or 208, and transmission of corresponding control signals to appropriate luminaires for changing illumination (e.g. recalling a particular scene). This arrangement also allows obtaining, storing, evaluating, selecting and distributing or dispatching of illumination settings, which functions are advantageously performed autonomously, in the background, without direct user intervention.

The function of determining illumination settings, and distributing determined settings to appropriate luminaires is preferably provided by one, or a combination of elements in the functional group shown schematically in dashed line and labelled 212, however some functionality may be distributed to the storage device or server 214.

Figure 3:
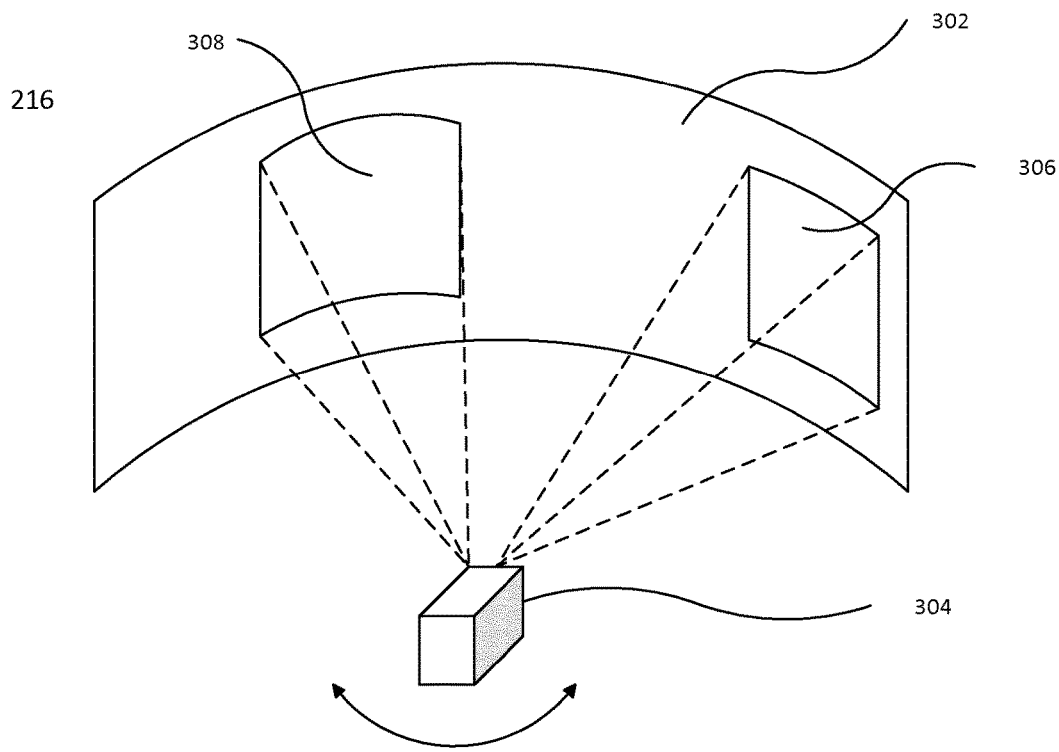
FIG. 3 illustrates a panoramic image capture process.

FIG. 3 illustrates a panoramic image and constituent image portions.

The term panoramic image generally refers to an image that is generated by stitching multiple images together by applying a suitable image processing algorithm that is executed on a processor comprising one or more CPUS and/or GPUS, wherein each image is taken, i.e. captured, at non-overlapping moments in time. Such image stitching algorithms are known in the art, and are readily available. Each of these images is herein referred to as a sub-image of the panoramic image. FIG. 3 illustrates the generic concept of capturing a panoramic image 302 via a scanning motion of a camera device from right to left. The term "scanning motion" refers to the motion of the camera device, as multiple sub-images are captured as part of the panoramic image.

As can be seen in FIG. 3, an image capture device such as a camera 304, captures a plurality of individual sub-images 306, 308 at a plurality of different instances in time, and these are combined, i.e. stitched together, to form the panoramic image. The field of view of the camera device determines the extent of the physical space that is captured in each sub-image, i.e. each sub-image captures a region of the physical space that is smaller than the region of the physical space that is captured by the panoramic image. The field of view of the camera device refers to the solid angle through which the camera's image sensor is sensitive to electromagnetic radiation (e.g. photons of visible light). The field of view covered by an individual image refers to the field of view of the camera when the image is captured, which depends on the position and orientation of the camera.

In some embodiments, the camera device may capture multiple sub-images of the same region of physical space. That is, the region of physical space that falls within the field of view of the camera device may be captured multiple times before a subsequent sub-image, covering a different region of the physical space, is captured.

It will be appreciated that, whilst FIG. 3 is shown from the perspective of a user performing a scanning motion from left to right, in reality, a user may perform a scanning motion in any direction, in any of three spatial dimensions. Therefore component of scanning in an upwards and downwards direction can be included, so the panoramic image is not necessarily bounded by the height dimension of an individual sub image. Furthermore, a user may rotate their camera device through any angle, about any axis, or combination of axes, in three spatial dimensions. In most circumstances it is anticipated that the user will wish to capture a panoramic image of the physical space that is in their own field of view, which in turn, is most likely to involve rotating their body, and consequently their camera device. Thus the panoramic image has a wider field of view than any one of the images individually, in the sense that it corresponds to light captured over a greater solid angle—and hence, from a larger spatial area—than any one image alone. In other words, the stitching together effectively widens the field of view of the camera, beyond its physical limitations.

Imaging a scene or environment, such as by taking a panoramic image, can allow the position of objects in the image to be determined. In particular, luminaires in the scene or environment can be identified, and their positions determined or estimated. Also, and potentially of more relevance, is the "illumination footprint" of each luminaire. This term is used to refer to a region of an incident surface or surfaces receiving light from that luminaire, and may be defined in terms of the predominant pattern, shape or size. The location of an illumination footprint may therefore differ from the location of the luminaire itself, however the two are closely related, and may be used interchangeably in certain circumstances. For example a ceiling mounted wall washer may be located in the ceiling of a room, but its illumination footprint may be located on an adjacent wall for example. Furthermore, the illumination footprint of a luminaire may be visible in an image of a scene, and such footprint can be identified in an image, even if the actual luminaire is obscured.

The position or location of luminaires, and/or corresponding illumination footprint may be determined in a number of ways.

In one example, coded light is output from some or all of the luminaires. Such coded light may be in the visible spectrum, or may be outside of it, such as infrared. The coded light can be recognized in the image (either by the image capturing device, or in subsequent processing) and linked to a particular luminaire or luminaires. In another example, light of different color can be used to distinguish the output of a luminaire or luminaires captured in an image. This could be used as an alternative to, or in addition to coded light outputs.

The luminaires can be controlled dynamically, particularly for the purpose of identification and location. This is particularly useful when multiple images are being captured, as in the case of a panoramic image. For example, luminaires can be turned on or off in sequence which may assist each luminaire or equivalently its illumination footprint to be uniquely recognized, even when the footprints from luminaires overlap. Optionally such dynamic control may be performed in coordination with movement of the image capture device, and may even be controlled based at least in part on movement of the image capturing device, which may be able to communicate with the individual luminaires, or the lighting system of which they form a part.

For example, the dynamic illumination pattern may ensure that a first luminaire is in an emitting state (i.e. switched on and emitting light) and that a second luminaire is in a non-emitting state (i.e. switched off and not emitting light), when a first sub-image is captured. As the user captures a second sub-image, the dynamic illumination pattern may ensure that the first luminaire is in a non-emitting state and that the second luminaire is in an emitting state.

The dynamic illumination pattern may vary the number and/or combination of luminaires that are switched on or off, at a given point in time, during the capture of the panoramic image. The number, or combination of luminaires that are switched on at a given point in time may depend on the scanning motion performed by the user. For example, whether a given luminaire is switched on or off may depend on whether that luminaire is expected to appear in an individual sub-image that is being captured at a first point in time.

Further techniques for identifying and locating luminaires may not rely on the light output from the luminaire, or from the capture of the luminaire (or the corresponding illumination footprint) and include RF beacons, multiple cameras (stereoscopic vision) IR depth imaging, laser measurement such as lidar, or ultra-wide band techniques for example.

The capture of an image in this way can allow a primary viewing position and/or direction of viewing to be determined. The primary viewing position can be taken as the position from which the image or images are captured for example. The primary viewing direction may be indicated by a specific user input, for example during a panning action for taking a panoramic image. Alternatively the primary viewing direction can be estimated based on the content of the captured image, as described below.

Figure 4:
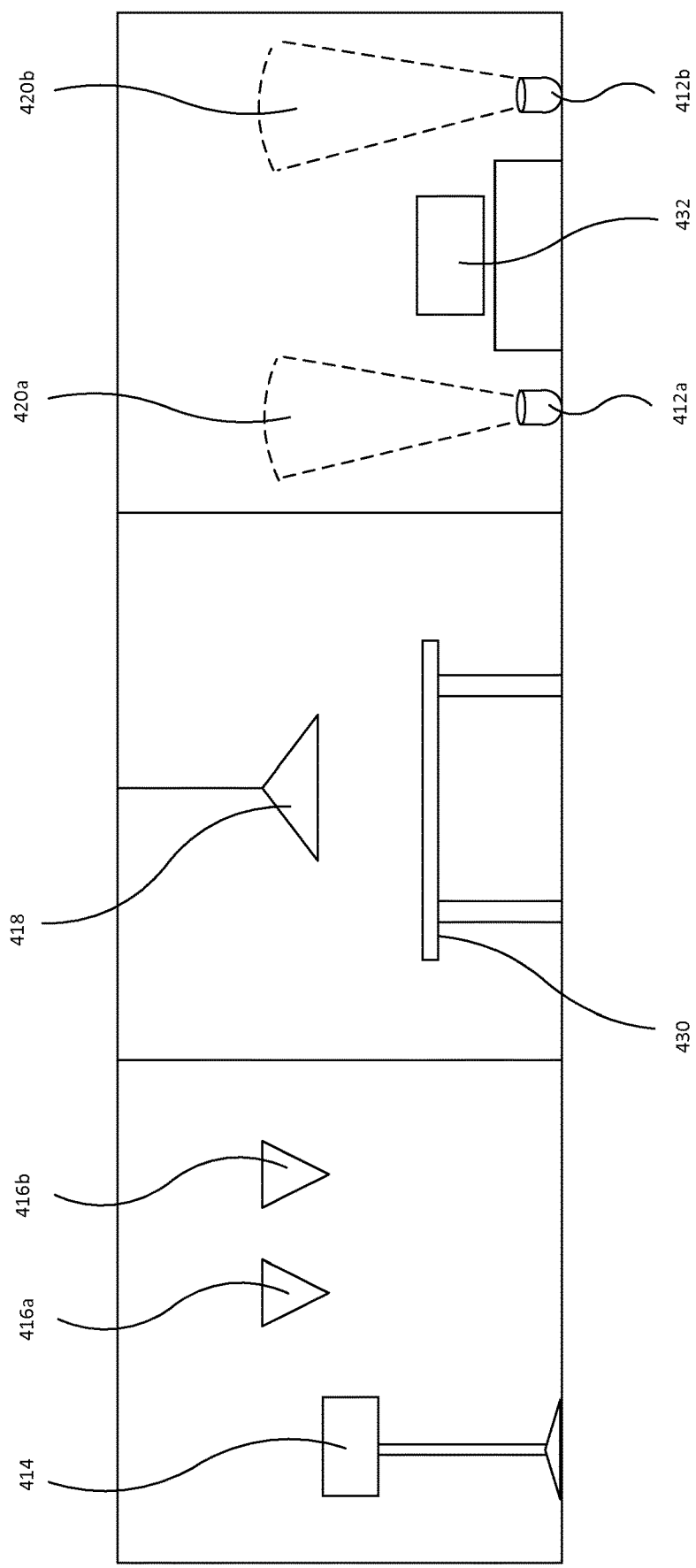
FIG. 4 represents an image of a room as shown in FIG. 1.

FIG. 4 is an example panoramic image of the environment 102 of FIG. 1. In this example, luminaires 112, 114, 116 and 118 of FIG. 1 are identified respectively as 412, 414, 416 and 418. In the case of luminaires 412, the illumination footprint 420 is also identified, as a pattern on the wall.

The relative position of each of the luminaires within the physical space may be determined based on the relative positions of each of the identified luminaires in the panoramic image, or vice versa. In other words, a mapping may be established between the locations of the luminaires in the physical space and the locations of the illumination sources in the panoramic image. The user does not need to manually indicate the position of the lights in the panoramic image, or manually assign which luminaire in the panoramic image corresponds to a specific luminaire with a specific communication address in the lighting control system. Nevertheless, the possibility of using manual input in identifying the luminaires is not excluded.

Also identified in the image of FIG. 4 are a table 430 and a television 432. These are examples of recognizable non-lighting objects, which may have an activity or predetermined lighting setting or settings associated with them. For example a table may be associated with eating or dining, and a television with watching the television. As another example, a bed may have an associated lighting setting or schedule associated. Such objects can be recognized using image processing and object recognition algorithms. Generic types of objects may be recognized, for example chairs, tables, beds etc., but also specific items such as a particular speaker or games console, possibly identified by model or manufacturer can be recognized. In an office environment, objects such as cubicles, partitions, printers and corridors can be recognized for example.

The position of objects recognized in this way can be determined relative to the positions of the luminaires or illumination footprints. In one example the distance of a recognized object to each luminaire in the environment can be determined.

The relative position of objects and luminaires may be determined in three dimensions, reflecting the determined or estimated positions in three dimensions. However, in embodiments, it may be sufficient to determine the relative positions in fewer dimensions, for example a distance in the 2D image may suffice. In the example of a panoramic photo, this may correspond to a measure of angular separation in space relative to a center of rotation of the image capturing apparatus for example.

The relative position of each luminaire to recognized objects can be used to control the lighting system.

In one example, each recognized object may have one or more predefined activities associated with it, and each such activity can be used as an input or control for setting illumination of the space or environment in which the system operates. In this way, the system can determine luminaires which are most likely to be used for light settings relating to user activities or use cases. For example, lights close to the television can be used for entertainment settings, while luminaires close to a sofa or lounge chair may be used for a "relaxing" setting.

In addition, a primary viewing direction may be determined or estimated based on recognized objects. For example a television may indicate a primary viewing direction towards the television, or a lounge chair may indicate a primary viewing direction away from the chair, aligned with the direction of the chair for example. Multiple viewing directions can therefore be determined in some cases, associated with different activities or objects.

FIG. 5 illustrates different types of data representing illumination settings, or "scenes". In FIG. 5a, a lighting system, or a space such as a room corresponding to a sub-set of a lighting system includes four individually addressable luminaires, but the particular scene, which may correspond to an entertainment scene, requires only three—numbers 1, 2 and 4. These luminaires may be selected based on their position relative to a television, determined as described above. For each of these luminaires, a brightness value and a color value are provided. Other values, such as an effect value, could also be provided if desired. Single numerical values of brightness and color are provided here as simplistic examples, but it will be understood that different embodiments may use different values or combinations of values to represent parameters. For example color could be represented by three values in RGB or L*a*b* color space, and some parameters such as an off/on parameter may take a Boolean true/false value. Further parameters such as a time or duration could also be included.

FIG. 5b shows an alternative approach, in which rather than specific luminaires being set as scene data, the number of luminaires is set instead. Here, all of the identified number of luminaires are set using the same brightness and color data. In this case, the selection of which luminaires to operate may be based on the position of the available luminaires relative to an associated recognized object. In an example the recognized object is a television, and the associated light setting is an entertainment setting, and thus the three luminaires (or illumination footprints) closet to the television could be selected and controlled based on the setting data.

Finally, in FIG. 5c, rather than the number of luminaires, a distance from a recognized object is set in the scene data. Again using the television as an example, all luminaires within 2 m of the television are selected and controlled using the given brightness and color values, based on the determined position of the luminaires or illumination footprint, with respect to the television.

In the above examples, a luminaire can be associated with a recognized non-lighting object, and a corresponding light setting or scene. This can be considered a positive association, but conversely negative associations are also possible. For example, a luminaire or illumination footprint which is directed towards a lounge chair may be considered unlikely to be used for an entertainment use case or scene, and a light strip mounted on the floor directed upwards may be considered unlikely to be used when reading a book or working at a table, and therefore not used in scenes associated with these activities.

Setting or scene data can take advantage of such negative associations. In one example based on FIG. 5b, if a system or part of a system in a room includes only 4 luminaires, and one of these has been determined to be negatively associated with the given scene, then the other three luminaires can be selected by default, even if their positions are not determined. Positive and/or negative associations can also be used to determine luminaires which are functional (direct illumination contribution) or ambient (background illumination). This can be used to determine how to render a scene. For example functional lights are typically controlled to provide less saturated colors or white tones, whereas ambient lights typically provide more saturated colors Returning to the example of FIG. 4 then, luminaires 416b, 418 and 412a are determined to be sufficiently close to the identified table 430, to be associated with a dining activity. These luminaires are therefore used or assigned for a dining scene. Similarly, luminaires 412a and 412b are associated with an entertainment activity or scene, by virtue of their proximity to the identified television 432.

Thus it has been described above how luminaires can be associated with at least one activity or use case, and in turn with a light setting or scene, based on proximity to a recognized object which has already been associated with that activity or use case.

Certain recognized objects, or classes of recognized objects, however, may give rise to further effects or associations with luminaires. In one example, associations to control modalities can be created for particular types of recognized objects. For example lights located proximate to audio/video components, such as a television or games console can be controlled by these components.

Windows may be recognized in cases, and the position of luminaires relative to a window may be used to control that luminaire. Luminaires determined to be close to a window may be used for advanced lighting effects related to daylight or circadian rhythms, such as simulating or complementing sunrise or sunset for example. In one example, the distance of a luminaire from a window may be used to create a moving effect, with those closest to the window being used to create an effect first, with those further away joining the effect progressively, to simulate sun coming through a window for example.

Recognized objects can include loudspeakers, and potentially specific brands of loudspeaker, or loudspeakers having a particular functionality, such as networked loudspeakers, and luminaires near or adjacent to such loudspeakers can be determined. The luminaires so identified can be coupled or associated with the loudspeakers, to provide lighting effects related to the audio being produced by the relevant speaker. For example, if an explosion sound is produced as part of a gaming application or film, then a light effect can be synchronized to the sound, and will be perceived as coming from substantially the same direction. Alternatively lighting effects can be produced to accompany music, which effects are spatially aligned to the relevant speakers.

Recognition of a television has been discussed above, but in some examples, the size of screen or type of screen may be determined. Say a very large computer screen or monitor is identified, then it can be assumed that the workspace is predominantly directed to computer work, for which low lux lighting is best suited. The absence of a computer screen on a desk (potentially recognizable by height or position or paperwork located on the surface) may also be recognized, and paperwork is assumed to be the most prevalent activity, therefore high lux lighting is best suited.

In commercial applications, such as office installations, the position of glass walls may be determined. If there is a glass wall in a private office say, lights next to that glass wall on either side can be linked to ensure that there is never a lighting setting or scene whereby lights in a corridor are off while the office is occupied. Similarly in a residential application, luminaires located in spaces divided by glass walls may be controlled in concert, for example to avoid full darkness in a partially visible adjacent space.

In an application where fire exits can be recognized, e.g. in a public building, and in the case of a fire, non-emergency luminaires located close to the fire exit can be used to assist emergency egress features.

Figure 6:
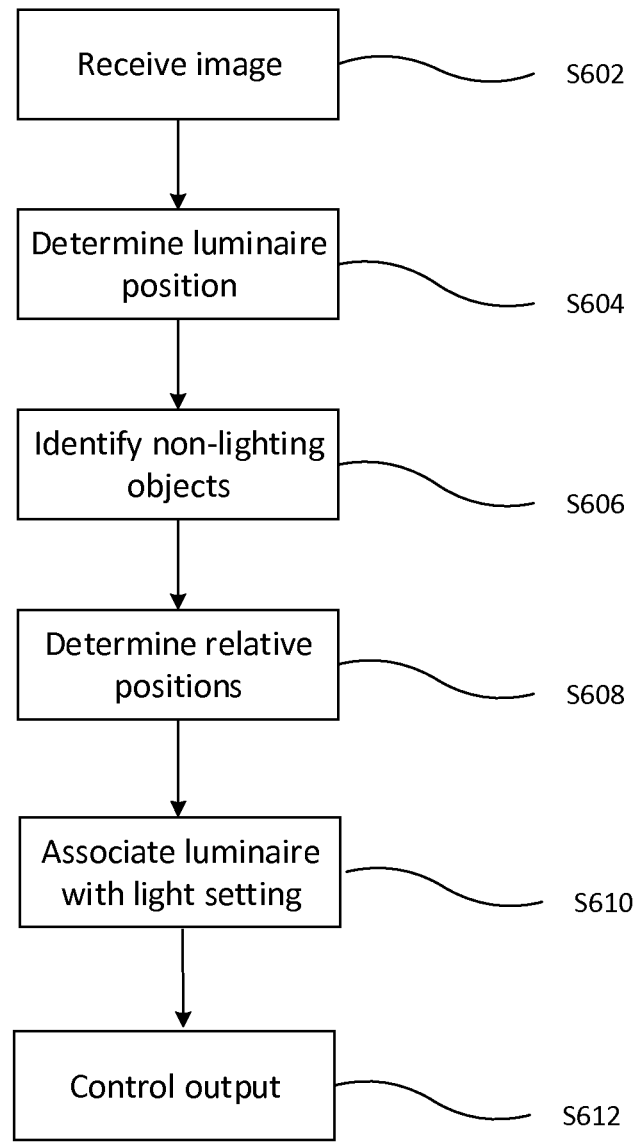
FIG. 6 is a flow diagram illustrating an example of a process for illumination control.

FIG. 6 is a flow diagram illustrating an example of a process for lighting control.

At step S602 an image is received of a scene or space including one or more luminaires which are part of a lighting system. This may be a single image, preferably incorporating a wide angle of view, or may be a panoramic image, as described above. The image may be captured by a user, using a camera, or a device equipped with a camera such as a smartphone for example, which may additionally function as mobile user terminal 108 of FIG. 1 for example. The user may be prompted to capture an image or images, and may be provided with instructions about the direction of view, or changes in the direction of view for capturing an image or images.

At step S604 the position of luminaires, or of the illumination footprint of such luminaires is determined. As described above, this may be by image analysis in which light emitted by the luminaires can be identified, or may be by other means such as identification beacons.

At step S606, the image obtained in step S602 is analyzed to identify non-lighting objects. Such non-lighting objects are typically pre-defined objects, or object types, having known characteristics or identifying features. The positions of these objects in the image can be determined.

Based on the position of the luminaires determined in step S604 and the positions of the non-lighting objects in step S606, the relative positions of these two entities can be determined in step S608. The relative position may be determined based on positions in 3D space, or a relative position only in the image space (i.e. the position in the received image). Thus the geometric distance need not be known, and an indication of relative position, such as a relative angular measure, may suffice in examples.

In step S610, luminaires are associated with light settings or lighting control parameters, based on their proximity to one or more of the identified non-lighting objects. In one example, the non-lighting object will have a setting, or control logic or parameters associated with it, and luminaires will be indirectly linked, via proximity based association with that object. In some cases, the non-lighting object may be only indirectly linked with a setting or control parameters, via an activity or use case. Therefore in examples a luminaire may be associated with an object which it is deemed close, or sufficiently close to, which object may in turn be linked with a user activity. That user activity can in turn be related to a light setting or scene, and thus that luminaire is associated with such a scene.

Finally in step S612, one or more luminaires, having been associated with a light setting or control parameter, is controlled to provide illumination output based on that associated setting or parameter. The control may be to turn on or turn off the luminaire, or to set an output parameter such as brightness or color for example.

It will be understood that the present invention has been described above purely by way of example, and modification of detail can be made within the scope of the invention. Each feature disclosed in the description, and (where appropriate) the claims and drawings may be provided independently or in any appropriate combination.

The various illustrative logical blocks, functional blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the function or functions described herein, optionally in combination with instructions stored in a memory or storage medium. A described processor may also be implemented as a combination of computing devices, e.g., a combination of a DSP and a microprocessor, or a plurality of microprocessors for example. Conversely, separately described functional blocks or modules may be integrated into a single processor. The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, and a CD-ROM.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A lighting control method for controlling a plurality of lighting units arranged to provide illumination in an area, the method comprising
receiving one or more images of the area;
determining the position of at least one of said lighting units or a corresponding lighting footprint in said area;
identifying at least one non-lighting object, other than a person, in a received image of the one or more images of the area, said non-lighting object associated with a pre-defined user activity;
determining a relative position of said at least one non-lighting object to said at least one lighting unit or the corresponding lighting footprint;
determining a primary viewing direction;
associating, based on the determined relative position, said at least one lighting unit with at least one predetermined light setting associated with said pre-defined user activity; and
controlling said at least one lighting unit based on said at least one predetermined light setting and said primary viewing direction.

2. A method according to claim 1, further comprising capturing said received one or more images with an image capture device, by a user.

3. A method according to claim 1, wherein said one or more images comprises a panoramic image composed of a plurality of sub-images.

4. A method according to claim 1, wherein the position of a lighting unit or the corresponding lighting footprint is determined based on identification of the lighting unit or the corresponding lighting footprint in a received image of the one or more images of the area.

5. A method according to claim 1, wherein identifying said one or more non-lighting objects comprises matching with one or more predetermined non-lighting objects, each associated with one or more predetermined light settings.

6. A method according to claim 1, wherein lighting units determined to be within a predetermined distance of said non-lighting object are associated with that non-lighting object, and are controlled according to the at least one setting associated with said non-lighting object.

7. A method according to claim 1, wherein the at least one setting associated with said identified non-lighting object defines a number, N, of lighting units to be controlled, and wherein the N lighting units determined to be closest to the non-lighting object are controlled according to said setting.

8. A method according to claim 1, wherein said non-lighting object is at least one of: a television, a monitor, a games console, or a speaker.

9. A method according to claim 1, wherein at least one of said lighting units is controlled during capture of a received image for the purpose of identification in said image.

10. A method according to claim 9, wherein said at least one lighting unit is controlled using at least one of: colored light, coded light, a dynamic lighting sequence, or a beacon signal.

11. A method according to claim 1, wherein associating said at least one lighting units with said at least one light setting comprises a negative association, and wherein controlling said at least one lighting unit comprises preventing said lighting unit being controlled according to said light setting.

12. A method according to claim 8, wherein said at least one setting associated with said non-lighting object allows lighting units to be controlled by said non-lighting object, and wherein lighting units determined to be within a pre-determined distance are controlled based on output from said non-lighting object.

13. A non-transitory computer-readable medium comprising computer program code which, when executed on a computer, cause that computer to perform a lighting control method for controlling a plurality of lighting units arranged to provide illumination in an area, the method comprising:
  receiving one or more images of the area;
  determining the position of at least one of said lighting units or a corresponding lighting footprint in said area;
  identifying at least one non-lighting object, other than a person, in a received image of the one or more images of the area, said non-lighting object associated with a pre-defined user activity;
  determining a relative position of said at least one non-lighting object to said at least one lighting unit or the corresponding lighting footprint;
  determining a primary viewing direction;
  associating, based on the determined relative position, said at least one lighting unit with at least one predetermined light setting associated with said pre-defined user activity; and
  controlling said at least one lighting unit based on said at least one predetermined light setting and said primary viewing direction.

14. A lighting controller arranged for controlling a plurality of lighting units each arranged to provide illumination in an area, the lighting controller comprising:
  an interface for receiving one or more images of the area; and
  a processor arranged for:
    determining the position of at least one of said lighting units or a corresponding lighting footprint in said area;
    identifying one or more non-lighting objects, other than a person, in a received image of the one or more images of the area, said non-lighting object associated with at least one pre-defined user activity;
    determining a relative position of said at least one non-lighting object to said at least one lighting unit or the corresponding lighting footprint;
    associating, based on the determined relative position, said at least one lighting unit with at least one predetermined light setting associated with said pre-defined user activity; and
    controlling said at least one lighting unit based on said at least one predetermined light setting.

* * * * *